Figure 1A:
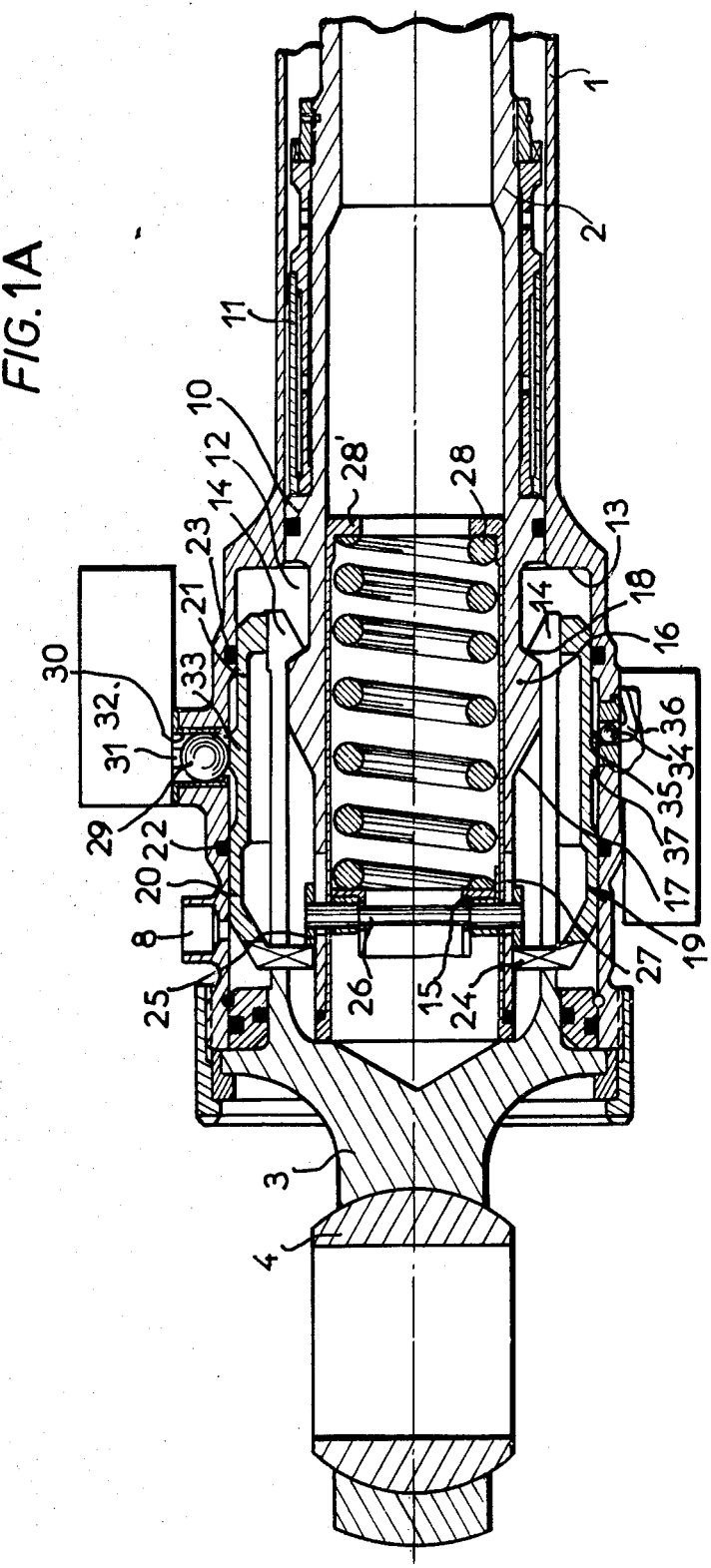

United States Patent [19]

Masclet

[11] 4,024,800

[45] May 24, 1977

[54] ACTUATING AND BRACING JACK

[75] Inventor: Jean Masclet, Paris, France

[73] Assignee: Messier Hispano, Montrouge, France

[22] Filed: Feb. 25, 1975

[21] Appl. No.: 552,777

[30] Foreign Application Priority Data

Mar. 27, 1974 France .............................. 74.10439

[52] U.S. Cl. ...................................... 92/26; 92/14; 92/27; 92/30; 92/109; 244/102 SL; 244/104 CS

[51] Int. Cl.² ......................................... F15B 15/26

[58] Field of Search ............. 92/14, 24, 26, 27, 28, 92/30, 108, 109; 244/102 SL, 104 CS, 104 FP

[56] References Cited

UNITED STATES PATENTS

| | | | |
|---|---|---|---|
| 2,042,371 | 5/1936 | Warren | 244/104 FP |
| 2,563,194 | 8/1951 | Shawbrook | 244/102 SL |
| 2,808,810 | 10/1957 | Lindley | 92/26 |
| 3,135,171 | 6/1964 | Michalak, Jr. | 92/14 |
| 3,135,172 | 6/1964 | Messerschmitt | 92/26 |
| 3,177,780 | 4/1965 | Andersen | 92/24 |
| 3,395,618 | 8/1968 | Fredd | 92/24 |
| 3,451,313 | 6/1969 | Andersen | 92/26 |
| 3,463,055 | 8/1969 | Bayles | 92/26 |
| R27,294 | 2/1972 | Fredd | 92/26 |

FOREIGN PATENTS OR APPLICATIONS

| | | | |
|---|---|---|---|
| 164,983 | 6/1953 | Australia | 92/24 |
| 556,947 | 5/1958 | Canada | 244/102 SL |

*Primary Examiner*—Martin P. Schwadron
*Assistant Examiner*—Abraham Hershkovitz

[57] ABSTRACT

An actuating and bracing jack comprising a cylinder and a rod which are pivotably connected at their free ends to a fixed member and to a moveable member respectively. The cylinder has at least at one of its extremities, an internal resilient catch member, and the rod carries a projection capable of coming into engagement behind the catch member. The cylinder has an enlarged cylindrical chamber housing a displaceable locking device capable of being driven by the rod upon retraction movement thereof, to a first position to which the catch member is firmly applied against the projection. The locking device is displaceable in the opposite direction in the cylinder under the action of an actuating fluid to a second position to which the catch member is freed. The rod is provided with a device for taking up play between the rod and cylinder, such device including a displaceable draw member which acts upon a member urging a slotted portion of the rod outwardly into close proximity to the cylinder.

7 Claims, 3 Drawing Figures

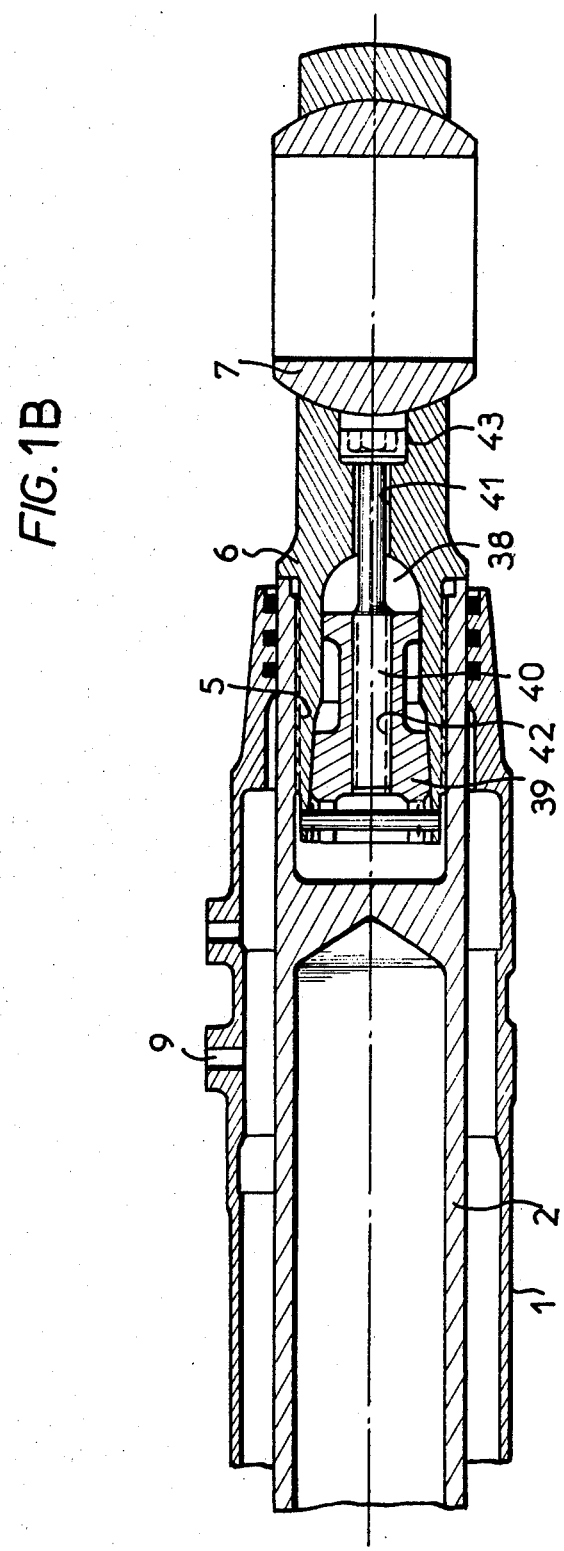

ACTUATING AND BRACING JACK

The present invention concerns an actuating and bracing jack, for example for an aircraft undercarriage train, that is to say, a jack intended to hold the undercarriage train in the extended or retracted positions.

In the known actuating and bracing jacks, contradictory requirements are encountered which are difficult to reconcile: on the one hand, when the jack rod is retracted, the jacks are subjected to substantial stresses applied by the ground loadings, when the undercarriage is in the taxiing position, and they must be suitably dimensioned as a result. On the other hand, when the jacks operate to retract the undercarriage train, the stresses are relatively small and the actuating cross-sections must be as small as possible, in order to avoid excessive consumption of actuating fluid. Thus, in the known actuating and bracing jacks, attempts to improve one of the two functions, that is to say, resisting the stresses and operating the undercarriage train, have always resulted in the other function being impaired.

An object of the present invention is to provide an actuating and bracing jack which, while being of the necessary mechanical strength, ensures very firm locking, and also has actuating cross-sections which are better suited to the needs of the jack and which are generally smaller than those of the known jacks.

The actuating and bracing jack according to the invention essentially comprises an actuating and bracing jack, comprising a cylinder and a rod which are pivotally connected at their free ends to a fixed member and to a movable member respectively, said cylinder carrying at at least one of its extremities, in its end, at least one longitudinal resilient catch member, and said rod carrying a projection capable of coming into engagement behind the catch member or members, said cylinder being provided at at least one of its extremities with an enlarged cylindrical chamber housing a locking device capable of being entrained by said rod, upon retraction movement thereof, towards a first position in which it holds the catch member or members firmly applied against the projection and capable of being entrained in the opposite direction in the cylinder under the action of the actuating fluid, towards a second position in which the catch member or members are freed.

The internal diameter of the cylinder is at the minimum equal to the external diameter of the projection, plus the operating clearance.

In a particular embodiment of the invention, the locking device comprises a tubular cap member which is mounted slidably in the cylinder and which has on the one hand two portions of different external diameters, which are in sealing contact with bore portions in the cylinder, the bore portions being of corresponding diameters, the larger-diameter portion of the cap member being towards the bottom end of the cylinder, and on the other hand, at least one heel portion which extends radially towards the rod to a position of projecting into the path of movement of at least one entrainment abutment which is mounted slidably, against the force of a return spring carried by the rod, in a longitudinal aperture provided on the rod, the length of the aperture being substantially equal to the travel movement of the cap member.

When the cap member is unlocked, it is displaced towards the above-defined second position. In theory, the cap member will remain in this position under the action of frictional forces. As an additional safety measure however, a securing device may be provided, for preventing untimely displacement of the cap member, such device being known per se.

The jack according to the invention further comprises a device for taking up clearances, one embodiment of which will be described by way of example. For this purpose, the end of the jack rod has a screw-threaded cavity, and a hollow end, provided with an external screw-thread, of an end member, is screw-threaded into said cavity, the end member possibly being slotted longitudinally and carrying at its other end a rotary bearing member, the hollow end at the end member acting as a housing for two tubular compression members which grip between their transverse faces at least two conical expansion washers, one of said tubular members abutting against the bottom end of the hollow end portion of the end member, while the second tubular member is capable of being entrained in an axial direction, with respect to the first member, thereby compressing the expansion washers, by means of a draw member being a screw-threaded rod which passes freely through the first tubular member and is screwed into a screw-thread provided in the second tubular member.

Figure 2:
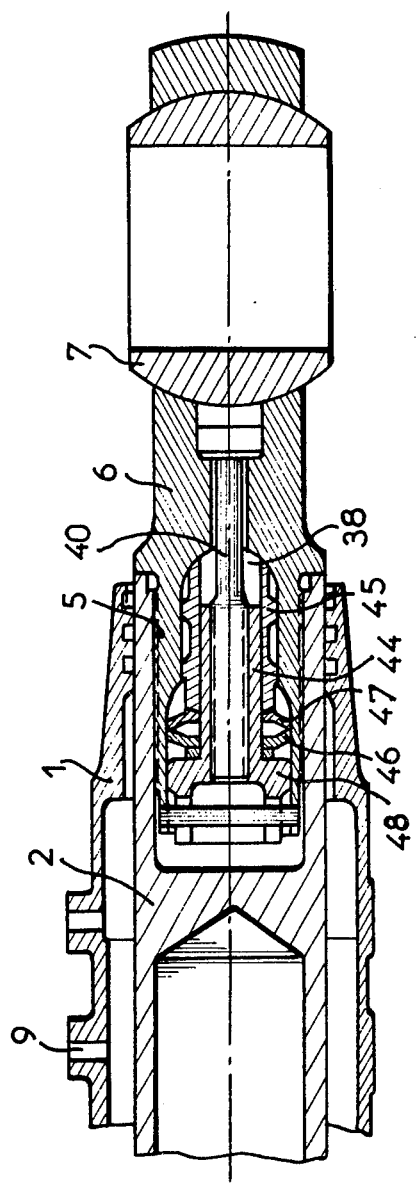

An embodiment of the invention will now be described with reference to the accompanying drawing, in which:

FIGS. 1A and 1B are complementary views in axial section of an actuating and bracing jack according to the invention, and, FIG. 2 is a view in section of an alternative embodiment of the device for taking up clearance in FIG. 1.

Referring to FIGS. 1A and 1B, the actuating and bracing jack comprises a cylinder 1 in which a hollow rod 2 is slidably mounted. The cylinder is closed at one end by an end cover member 3 carrying a rotary bearing 4, while the rod carries at its external end a screw-thread 5 into which is screwed a screw-threaded end member 6 carrying a rotary bearing 7. The rotary bearings 4 and 7 are intended, for example, to be pivotally connected to an undercarriage and to the aircraft.

The jack rod 2 is actuated by a actuating fluid such as an hydraulic fluid which is supplied to the cylinder by two supply apertures 8 and 9 disposed on respective sides of a piston 10 and a dashpot ring 11.

The cylinder 1 is enlarged at its end which adjacent the end cover member 3, to form a cylindrical chamber 12 which is connected to the bore of the cylinder by way of an annular shoulder 13. According to the invention, the end cover member 3 carries a plurality of resilient catch members 14, only two of which are shown in FIG. 1A. The catch members extend longitudinally in the chamber 12. The rod carries an annular projection 16 whose face 17 which is towards the end cover member has a small inclination; the catch members 14 can slide on the inclined face 17, so as to receive an opening movement. The face 18 of the projection 16, which is towards the piston 10, is shaped so as to co-operate with a locking action with the catch members 14. The projection 16 is so positioned on the rod 2 that, when the rod 2 comes into abutment against the end cover member 3, the catch members 14 engage behind the projection.

The presence of fixed catch members which are fixed with respect to the end cover member 3 makes it possible for the outside diameter of the jack to be much smaller than that of the known jacks which have movable catch members mounted on the rod.

In order to hold the catch members in the locked position, the jack also comprises a tubular locking cap 19 which is mounted slidably with a sealing action in the chamber 12, the cap being slidable between a first position as shown in FIG. 1A in which it embraces the catch members 14 and holds them firmly applied against the projection 16, and a second position in which the cap is in abutment against the shoulder 13 of the chamber 12. The cap has two portions 20 and 21 of different diameters, and slides sealingly on two stepped portions of the chamber 12, the sealing action being provided by seals 22 and 23. The cap is located downstream of the supply aperture 8, and its larger-diameter portion 20 is towards the end cover member 3. This provides for displacement of the cap 19 towards the right in FIG. 1A, under the action of the actuating fluid which is introduced by way of the aperture 8.

At its end which is towards the end cover member 3, it further comprises a heel portion 24 which extends radially beyond the catch members 14, until it is virtually touching the rod 2. In the vicinity of its inward end, the rod 2 carries a movable annular abutment 25 which is mounted slidably around the rod 2. The movable abutment 25 comprises radial cross-bracing rods 26 which pass through longitudinal apertures 27 provided in the rod, the length of the apertures being substantially equal to the travel movement of the locking cap 19 between its two limit positions. The abutment 25 is normally urged towards its extreme left-hand position in FIG. 1 by a spring 28 which is disposed within the rod and which bears at one end against a cup member 28' which is fixed with respect to the rod and at the other end against an annular support member 15.

The mode of operation of the above-described jack is as follows:

In the position shown in the drawing, the jack is locked. In order to unlock the jack, pressure fluid is introduced into the supply aperture 8 and, because of the difference in diameter of the cap 19 at the level of the seals 22 and 23, the cap is displaced towards the right in FIG. 1, entraining the abutment 25 which compresses the spring 28. When the cap 19 comes into a position of abutment against the shoulder 13, the catch members 14 are disengaged and the rod 2 can move out, opening the catch members.

In order to retract the rod of the jack, pressure is passed into the aperture 9. The projection 16 opens the catch members 14 and at the same time the annular abutment 25 entrains the cap member 19 towards the left, bearing against the heel portion 24. The configuration is such that, as soon as the catch members have engaged behind the projection 16, the cap 19 arrives at the end of its travel to the left in the drawing, thus locking the catch members 14.

The jack also comprises an electrical locking signalling device. In the embodiment illustrated in FIG. 1A, this device comprises a ball 29 mounted slidably within a passage 30 provided in the wall of the cylinder 1. The ball 29 is urged radially outwardly so as to actuate the contact 31 of a circuit 32, by way of a projecting portion 33 formed on the outside face of the cap.

When the cap 19 has been moved towards its extreme righ-hand position, and the pressure drops, friction is sufficient to hold it in position. According to the invention, as an additional safety measure, there is provided a known device for holding the cap 19 in the unlocked position. Such a device may comprise, for example, a ball 34 which is mounted slidably in a passage 35 provided in the wall of the cylinder 1, the ball being urged into rubbing contact with the cap 19, by spring means, for example a pawl 36. When the cap is in the unlocked position, the ball 34 is capable of penetrating behind a shoulder 37 formed on the cap.

Particular steps are taken in accordance with the invention to prevent clearances between the movable components of the jack. In the emodiment shown in FIG. 1B, clearances are taken up in conventional manner by expansion of the screw thread of the end member 6. For this purpose the end member 6 is hollow and comprises at least one longitudinal slot (not shown). The cavity 38 of the end member comprises a portion of frustoconical cross-section, in which there is mounted an expansion member 39 of substantially complementary cross-section. The expansion member 39 is connected to the end member 6 by means of a draw member having a screw-threaded rod 40 which passes through an axial passage 41 in the end member and is screwed in an axial screw-thread 42 provided in the member 39. The head 43 of the draw member bears against a shoulder on the end member 6. The head 43 of the draw member is accessible to a screwing tool, from the rotary bearing 7 side.

In the embodiment in FIG. 2, the end member 6 also has a cavity 38 but this is of cylindrical shape. In this particular construction, the end member 6 is not necessarily slotted. The expansion member of the above embodiment is replaced by two tubular compression members 44 and 45 between which are gripped two resilient conical washers 46 and 47. The member 45 surrounds the member 44 and bears against the end of the cavity 38, while the inside member 44 is connected to the end member 6, by way of a draw member 40 which is fixed by screw-threading in the axis of the member 44. The washers 46 and 47 are disposed between the member 45 and a flange 48 of the member 44 and when the washers 46 and 47 are squeezed by relative displacement of member 45 and flange 48, the washers expand radially and lock the threads on end member 6 in the threads of rod 2 thereby to take up any clearances.

I claim:

1. An actuating and bracing jack comprising a cylinder and a rod which are pivotally connected at their free ends to a fixed member and to a movable member respectively, said cylinder including at least one of its extremities, at least one internal longitudinal resilient catch member, said rod including a projection capable of coming into engagement behind said catch member, said cylinder being provided at at least said one of its extremites with an enlarged cylindrical chamber of limited length, a displaceable locking device in said enlarged chamber, and means for displacing said locking device in said enlarged chamber by said rod, upon retraction movement thereof, to a first position in which said catch member is firmly applied against said projection, said locking device being displaceable in the opposite direction in said enlarged chamber in the cylinder under the action of an actuating fluid, to a second position in which the catch member is freed, said rod having one end with a threaded recess, a hollow end member having one end threaded into said recess, rotary bearing means between the other end of the end member and the associated movable member, and means in said hollow end member for taking up clearance between said one end of the rod and said hollow end member, comprising two tubular compression members in the hollow end member, at least two conical expansion washers gripped between said tubular compression members, a first of said tubular members abutting against the bottom of the hollow of said end member, the second of said tubular members being axially displaceable with respect to said first tubular member for compressing the expansion washers, and a draw member threadably engaged in said second tubular member while freely traversing the said first tubular member.

2. A jack according to claim 1, wherein the internal diameter of the cylinder is at a minimum equal to the external diameter of the projection, plus operating clearance.

3. A jack according to claim 1, wherein said locking device comprises a tubular cap member which is mounted slidably in the chamber of the cylinder, said cap member including two portions of different external diameters, which are in sealing contact with bore portions of the cylinder, the larger diameter portion of the larger diameter portion of said cap member being closer to the said at least one extremity of the cylinder said means for displacing the locking device upon retraction of said rod comprising at least one heel portion on said cap member extending radially towards the rod, and at least one entrainment abutment on said rod positioned to engage said heel portion, and a return spring carried by the rod for resisting displacement of said abutment and cap member.

4. A jack according to claim 3, comprising a securing device for preventing untimely displacement of the cap member.

5. A jack according to claim 4, wherein said securing device comprises a ball mounted in an aperture provided in the wall of the said enlarged chamber, and spring means acting on said ball to urge the same into contact with the cap member.

6. An actuating and bracing jack, comprising a cylinder and a rod which are pivotally connected at their free ends to a fixed member and to a movable member respectively, said cylinder including at least one of its extremities at least one internal longitudinal resilient catch member, said rod including a projection capable of coming into engagement behind said catch member, said cylinder being provided at least on of its extremities with an enlarged cylindrical chamber, a tubular cap member mounted slidably in said chamber and including two portions of different external diameters in sealing contact with bore portions in the cylinder of corresponding diameters, the larger-diameter portion of the cap member being closer to the said one extremity of the cylinder, at least one heel portion on said cap member extending radially towards the rod, at least one entrainment abutment on said rod positioned to engage said heel portion, said rod having a longitudinal aperture, the length of the aperture being substantially equal to the travel movement of the cap member, said abutment being slidable in said aperture, spring means in said rod for opposing displacement of the abutment, said rod having one end with a screw-threaded recess, a hollow end member having one end threaded into said recess, said end member being slotted longitudinally, a rotary bearing member at the other end of said end member, said end member at said one end being provided with a cavity, two tubular compression members in said cavity, at least two conical expansion washers gripped between said tubular compression members, one of said tubular members abutting against the bottom of the hollow end of the end member, and a draw member for displacing the second tubular member in an axial direction, with respect to the first member, thereby compressing the expansion washers, said draw member having a threaded rod which passes freely through the first tubular member and is screwed into the second tubular member.

7. An actuating and bracing jack comprising a cylinder and a rod which are pivotally connected at their free ends to a fixed member and to a movable member respectively, said cylinder including at at least one of its extremities, at least one internal longitudinal resilient catch member, said rod including a projection capable of coming into engagement behind said catch member, said cyliner being provided at at least said one of its extremities with an enlarged cylindrical chamber of limited length, a displaceable locking device in said enlarged chamber, and means for displacing said locking device in said enlarged chamber by said rod, upon retraction movement thereof, to a first position in which said catch member is firmly applied against said projection, said locking device being displaceable in the opposite direction in said enlarged chamber in the cylinder under the action of an actuating fluid, to a second position in which the catch member is freed, said locking device comprising a tubular cap member which is mounted slidably in the chamber of the cylinder, said cap member including two portions of different external diameters, which are in sealing contact with bore portions of the cylinder, the larger diameter portion of said cap member being closer to the said at least one extremity of the cylinder, said means for displacing the locking device upon retraction of said rod comprising at least one heel portion on said cap member extending radially towards the rod, and at least one entrainment abutment on said rod positioned to engage said heel portion, and a return spring carried by the rod for resisting displacement of said abutment and cap member, said rod having one end with a threaded recess, a hollow end member having one end threaded into said recess, said end member being slotted longitudinally, a rotary bearing member at the other end of said end member, said end member at said one end being provided with a cavity, two tubular compression members in said cavity, at least two conical expansion washers gripped between said tubular compression members, one of said tubular members abutting against the bottom of the hollow of the end member, and a draw member for displacing the second tubular member in an axial direction, with respect to the first member, thereby compressing the exapnsion washers, said draw member having a threaded rod which passes freely through the first tubular member and is screwed into the second tubular member.

* * * * *